(12) United States Patent
Chen et al.

(10) Patent No.: US 10,964,025 B2
(45) Date of Patent: Mar. 30, 2021

(54) ASSEMBLY MONITORING METHOD AND DEVICE BASED ON DEEP LEARNING, AND READABLE STORAGE MEDIUM

(71) Applicant: Qingdao University of Technology, Shandong (CN)

(72) Inventors: Chengjun Chen, Shandong (CN); Chunlin Zhang, Shandong (CN); Dongnian Li, Shandong (CN); Jun Hong, Shandong (CN)

(73) Assignee: Qingdao University of Technology, Qingdao (CN)

( * ) Notice: Subject to any disclaimer, the term of this patent is extended or adjusted under 35 U.S.C. 154(b) by 0 days.

(21) Appl. No.: 16/739,115

(22) Filed: Jan. 10, 2020

(65) Prior Publication Data
US 2020/0273177 A1 Aug. 27, 2020

(30) Foreign Application Priority Data
Feb. 22, 2019 (CN) .......................... 201910131395.1

(51) Int. Cl.
| | |
|---|---|
| G06T 7/11 | (2017.01) |
| G06T 19/20 | (2011.01) |
| H04N 7/18 | (2006.01) |

(52) U.S. Cl.
CPC ................ *G06T 7/11* (2017.01); *G06T 19/20* (2013.01); *H04N 7/18* (2013.01);
(Continued)

(58) Field of Classification Search
None
See application file for complete search history.

(56) References Cited

U.S. PATENT DOCUMENTS

| | | | |
|---|---|---|---|
| 10,013,627 B1* | 7/2018 | Mishra | ...................... G06F 3/08 |
| 2013/0191461 A1* | 7/2013 | Batra | ...................... G06F 30/00 |
| | | | 709/206 |

(Continued)

OTHER PUBLICATIONS

Chen et al.; "Automated positioning of 3D virtual scene in AR-based assembly and disassembly guiding system;" Int. Journal of Advanced Manufacturing Technology (2015); pp. 753-764; Springer-Verlag London; Published online: Sep. 6, 2014 (Year: 2014).*

(Continued)

*Primary Examiner* — Edward Martello

(57) ABSTRACT

The present invention relates to an assembly monitoring method based on deep learning, comprising steps of: creating a training set for a physical assembly body, the training set comprising a depth image set $D_i$ and a label image set $L_i$ of a 3D assembly body at multiple monitoring angles, wherein i represents an assembly step, the depth image set $D_i$ in the ith step corresponds to the label image set $L_i$ in the ith step, and in label images in the label image set $L_i$, different parts of the 3D assembly body are rendered by different colors; training a deep learning network model by the training set; and obtaining, by the depth camera, a physical assembly body depth image C in a physical assembly scene, inputting the physical assembly body depth image C into the deep learning network model, and outputting a pixel segmentation image of the physical assembly body, in which different parts are represented by pixel colors to identify all the parts of the physical assembly body. In the present invention, parts in the assembly body can be identified, and the assembly steps, as well as the occurrence of assembly errors and the type of errors, can be monitored for the parts.

9 Claims, 2 Drawing Sheets

(52) U.S. Cl.
CPC ............... *G06T 2207/10024* (2013.01); *G06T 2207/10028* (2013.01); *G06T 2207/20081* (2013.01); *G06T 2207/20084* (2013.01); *G06T 2207/30108* (2013.01); *G06T 2219/004* (2013.01); *G06T 2219/2012* (2013.01)

(56) References Cited

U.S. PATENT DOCUMENTS

| | | | |
|---|---|---|---|
| 2014/0298227 A1* | 10/2014 | Gass | G06F 3/0484 715/771 |
| 2014/0310595 A1* | 10/2014 | Acharya | G06F 3/04842 715/706 |
| 2015/0187091 A1* | 7/2015 | Hata | G06T 7/75 382/101 |
| 2016/0125654 A1* | 5/2016 | Shikoda | G06Q 10/06316 345/633 |
| 2016/0171772 A1* | 6/2016 | Ryznar | G06F 3/0346 345/633 |
| 2019/0080475 A1* | 3/2019 | Ma | G06N 3/08 |

OTHER PUBLICATIONS

Neubig et al.;"DyNet: The Dynamic Neural Network Toolkit;" 33 pages; arXiv.org; arXiv:1701.03980V1; Jan. 15, 2017 (Year: 2017).*

* cited by examiner

ASSEMBLY MONITORING METHOD AND DEVICE BASED ON DEEP LEARNING, AND READABLE STORAGE MEDIUM

CROSS-REFERENCE TO RELATED APPLICATIONS

This application claims the benefit of priority from Chinese Patent Application No. CN201910131395.1, filed on Feb. 22, 2019. The content of the aforementioned application, including any intervening amendments thereto, is incorporated herein by reference in its entirety.

TECHNICAL FIELD

The present invention relates to an assembly monitoring method and device based on deep learning, and a readable storage medium, belonging to the field of computer monitoring based on image processing.

BACKGROUND OF THE PRESENT INVENTION

Personalized customization is one of main trends of development in the manufacturing industry. At present, the mechanical assembly industry in China is low in automation level. The assembly of a large number of customized products and complex mechanical products still relies on manual assembly. Due to the frequent change of product types and the large number of parts, the process and assembly accuracy are highly required. During the assembly, various events such as missing of parts and wrong assembly sequence occur easily, which affect the product assembly quality and efficiency. In order to better adapt to the new situation of the manufacturing industry and to meet the assembly of large-scale customized products, the conventional assembly workshop urgently needs an intelligent assembly monitoring system that can intelligently identify parts of the assembly body and monitor the assembly process.

On the other hand, during the assembly of complex products, the assembly progresses of components are not coordinated. As a result, the components needed during the final assembly of products are not all in readiness, thereby affecting the production efficiency. Therefore, it is also necessary to monitor and coordinate the assembly progresses of components, thus to improve the assembly efficiency.

The Invention Patent CN108491776A, entitled "METHOD AND DEVICE FOR ASSEMBLY PART IDENTIFICATION BASED ON PIXEL CLASSIFICATION, AND ASSEMBLY MONITORING SYSTEM", disclosed part identification by training a random forest model. The training process requires artificially designed deep differential features, and features cannot be learned automatically. This technical solution can only realize part identification and determine whether the part is wrong, and cannot further monitor whether the assembly position and assembly sequence of the part are wrong, so it is impossible to detect missing and misplacing in time.

SUMMARY OF THE PRESENT INVENTION

To solve the technical problems, the present invention provides an assembly monitoring method based on deep learning, by which parts in the assembly body can be identified, and the assembly steps during the assembly, as well as the occurrence of assembly errors and the type of errors, can be monitored for the parts.

The present invention employs the following technical solution.

An assembly monitoring method based on deep learning is provided, implemented by execution of a computer program by a processor, comprising steps of:

creating a training set for a physical assembly body, the training set comprising a depth image set $D_i$ and a label image set $L_i$ of a 3D assembly body at multiple monitoring angles, wherein i represents an assembly step, the depth image set $D_i$ in the ith step corresponds to the label image set $L_i$ in the ith step, and in label images in the label image set $L_i$, different parts of the 3D assembly body are rendered by different colors; the monitoring angle is an angle of view between a depth camera and an assembly body to be monitored, the depth camera is arranged in situ and changed in its capture angle within a preset rotation range to form the multiple monitoring angles; and the 3D assembly body is a 3D model of the physical assembly body; training a deep learning network model by the training set; and obtaining, by the depth camera, a physical assembly body depth image C in a physical assembly scene, inputting the physical assembly body depth image C into the deep learning network model, and outputting a pixel segmentation image of the physical assembly body, in which different parts are represented by pixel colors to identify all the parts of the physical assembly body.

Preferably, the step of creating a training set comprises: establishing a 3D assembly body, comprising 3D models of parts and a positional relation between the parts; annotating different parts in the 3D assembly body by different colors to establish an annotation model of the 3D assembly body; defining an assembly sequence model, comprising defining parts contained in each assembly step; and according to the assembly sequence model, loading annotation models of different parts, generating a 3D model and an annotation model for an assembly body corresponding to each assembly step, synthesizing a depth image set $D_i$ of the 3D assembly body at multiple monitoring angles by a depth buffer, and synthesizing a label image set $L_i$ by an imaging model of the depth camera, wherein i represents an assembly step, the depth image set $D_i$ in the ith step corresponds to the label image set $L_i$ in the ith step, and in label images in the label image set $L_i$, different parts of the 3D assembly body are rendered by different colors thus to establish a training set.

Preferably, the deep learning network model is a fully convolutional deep network comprising a convolution process and a deconvolution process, and the deep learning network model is trained by using the depth image set $D_i$ in the training set as the input to the deep learning network model and the label image set $L_i$ in the training set as the output from the deep learning network model.

Preferably, the step of obtaining, by the depth camera, a physical assembly body depth image C in a physical assembly scene comprises: in an initialization stage, fixing the depth camera, aligning the depth camera to an assembly zone, and capturing a physical assembly scene depth image A not containing the physical assembly body by the depth camera; in a circulation stage, capturing a physical assembly scene depth image B containing the physical assembly body by the depth camera; and in the physical assembly scene depth image A and the physical assembly scene depth image B, calculating the physical assembly body depth image C by subtracting depth values of corresponding pixel points, specifically: if the absolute value of the difference between depth values of corresponding pixel points in the depth image A and the depth image B is less than a preset threshold D, considering this pixel point in the depth image B as the background, or otherwise considering this pixel point in the depth image B as the assembly body; and if a pixel point in the depth image A and a pixel point in the depth image B have same coordinates in an image coordinate system, considering the two pixel points as corresponding pixel points.

Preferably, after identifying all the parts of the physical assembly body, the method further comprises assembly step monitoring: obtaining statistic information about the composition of pixels for parts in the pixel segmentation image of the physical assembly body, determining the composition of the parts, and inquiring a current assembly step according to the composition of the parts and based on the assembly sequence model to complete assembly step monitoring.

Preferably, after identifying all the parts of the physical assembly body, the method further comprises parts assembly monitoring: determining whether a part is assembled incorrectly, specifically: according to the current assembly step, comparing each pixel point in the pixel segmentation image of the physical assembly body with each pixel point in a correct label image corresponding thereto, and respectively calculating a pixel overlap rate $q_z$ between pixels for a part, which is assembled in the current assembly step, in the pixel segmentation image of the physical assembly body with respect to pixels for the part in the correct label image, $$q_z = \frac{n_c}{n_z},$$

wherein $n_c$ represents the number of pixel points, the coordinates of which are overlapped, for the assembled part in the correct label image and the pixel segmentation image, and $n_z$ represents the number of pixel points for the assembled part in the pixel segmentation image of the physical assembly body; the correct label image is a label image synthesized by the imaging model of the depth camera by using coordinates of the depth camera in the physical assembly scene as coordinates of a viewpoint in a virtual scene, and each step corresponds to one correct label image; and determining that the part is not assembled incorrectly if $q_z$ is greater than or equal to a preset overlap threshold E, or otherwise presenting examination information.

Preferably, the part assembly monitoring further comprises determining the type of assembly errors, comprising: according to the current assembly step, comparing each pixel point in the pixel segmentation image of the physical assembly body with each pixel point in a correct label image corresponding thereto, and respectively calculating a pixel reduction rate $q_n$ between pixels for a part, which is assembled in the current assembly step, in the pixel segmentation image of the physical assembly body with respect to pixels for the part in the correct label image, $$q_n = \frac{n_a - n_z}{n_a},$$

wherein $n_a$ represents the number of pixel points for the assembled part in the correct label image, and $n_z$ represents the number of pixel points for the assembled part in the pixel segmentation image of the physical assembly body; determining that the part is missed, when the $q_z$ for the part is less than or equal to a preset overlap threshold F and the absolute value of $q_n$ is greater than or equal to a preset missing threshold, that is, the part has a low overlap rate of pixel points and a great difference in the number of pixel points; and determining that the part is misplaced, when the $q_z$ for the part is less than or equal to the preset overlap threshold F and the absolute value of $q_n$ is less than or equal to a preset misplacing threshold, that is, the part has a low overlap rate of pixel points but a small difference in the number of pixel points.

The present invention further provides an assembly monitoring device based on deep learning, comprising a memory, a processor, and a computer program stored in the memory and can be run on the processor, wherein the program, when executed by the processor, causes the processor to perform steps of: creating a training set for a physical assembly body, the training set comprising a depth image set $D_i$ and a label image set $L_i$ of a 3D assembly body at different monitoring angles, wherein i represents an assembly step, the depth image set $D_i$ in the ith step corresponds to the label image set $L_i$ in the ith step, and in label images in the label image set $L_i$, different parts of the 3D assembly body are rendered by different colors; the 3D assembly body is a 3D model of the physical assembly body; training a deep learning network model by the training set; and obtaining, by the depth camera, a physical assembly body depth image C in a physical assembly scene, inputting the physical assembly body depth image C into the deep learning network model, and outputting a pixel segmentation image of the physical assembly body, in which different parts are represented by pixel colors to identify all the parts of the physical assembly body.

The present invention further provides a computer-readable storage medium storing a computer program that, when executed by the processor, causes the processor to perform steps of: creating a training set for a physical assembly body, the training set comprising a depth image set $D_i$ and a label image set $L_i$ of a 3D assembly body at different monitoring angles, wherein i represents an assembly step, the depth image set $D_i$ in the ith step corresponds to the label image set $L_i$ in the ith step, and in label images in the label image set $L_i$, different parts of the 3D assembly body are rendered by different colors; the 3D assembly body is a 3D model of the physical assembly body; training a deep learning network model by the training set; and obtaining, by the depth camera, a physical assembly body depth image C in a physical assembly scene, inputting the physical assembly body depth image C into the deep learning network model, and outputting a pixel segmentation image of the physical assembly body, in which different parts are represented by pixel colors to identify all the parts of the physical assembly body.

The present invention has the following beneficial effects:

1. in the present invention, the composition of parts of the assembly body is calculated by a deep learning neural network and according to a depth image, to realize the identification of the parts of the assembly body;

2. in the present invention, the deep learning network model is trained by a depth image set and a label image set, to realize the monitoring of the physical assembly and meet the assembly monitoring requirement for customized products; and 3. in the present invention, the assembly step monitoring, the missing determination, the misplacing monitoring and the like can be realized, and it is of great application value for large-scale customization in workshops.

DETAILED DESCRIPTION OF THE PRESENT INVENTION

The present invention will be described below in detail with reference to the accompanying drawings by specific embodiments.

Embodiment 1

Figure 1:
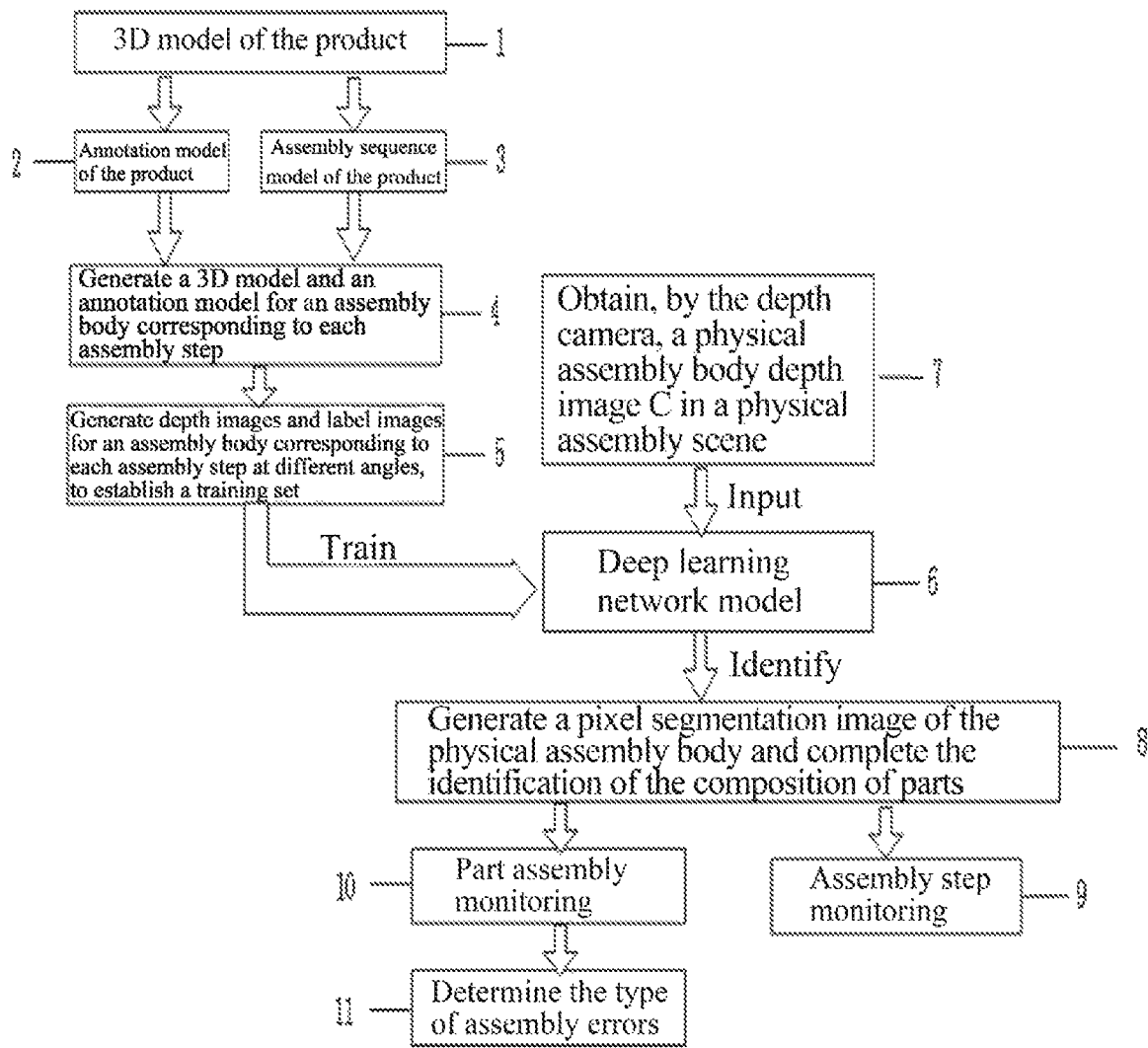
FIG. 1 is a schematic flowchart of an assembly monitoring method based on deep learning.

The Embodiment 1 of the present application provides a schematic flowchart of a verification method, as shown in FIG. 1, comprising:

1. establishing a 3D assembly body by CAD software or other three-dimensional software, comprising 3D models of parts and a positional relation between the parts;

2. importing the 3D assembly body into virtual reality modeling software (for example, Multigen Creator), and annotating different parts in the 3D assembly body by different colors to establish an annotation model of the 3D assembly body;

3. defining an assembly sequence model, comprising defining parts contained in each assembly step; and 4. according to the assembly sequence model, loading annotation models of different parts, and generating a 3D model and an annotation model for an assembly body corresponding to each assembly step.

5. A depth image set $D_i$ of the 3D assembly body at multiple monitoring angles synthesized by a depth buffer, and a label image set $L_i$ is synthesized by an imaging model of the depth camera, wherein i represents an assembly step, the depth image set $D_i$ in the ith step corresponds to the label image set $L_i$ in the ith step, and in label images in the label image set $L_i$, different parts of the 3D assembly body are rendered by different colors thus to establish a training set. Generally, the images in the depth image set $D_i$ and the images in label image set $L_i$ have a same resolution. A depth image set corresponding to each step contains a set of depth images at multiple monitoring angles in this assembly step, and a label image set corresponding to each step contains a set of label images at multiple monitoring angles in this assembly step.

6. The deep learning network model is trained by the training set. The deep learning network model is a fully convolutional deep network that replaces fully connected layers in the conventional convolutional neural network with convolutional layers, comprising a convolution process and a deconvolution process, and the deep learning network model is trained by using the depth image set $D_i$ in the training set as the input to the deep learning network model and the label image set $L_i$ in the training set as the output from the deep learning network model.

7. A physical assembly body depth image C in a physical assembly scene is obtained by the depth camera. The step of obtaining, by the depth camera, a physical assembly body depth image C in a physical assembly scene comprises: in an initialization stage, fixing the depth camera, aligning the depth camera to an assembly zone, and capturing a physical assembly scene depth image A not containing the physical assembly body by the depth camera; in a circulation stage, capturing a physical assembly scene depth image B containing the physical assembly body by the depth camera; and in the physical assembly scene depth image A and the physical assembly scene depth image B, calculating the physical assembly body depth image C by subtracting corresponding pixels, specifically: if the absolute value of the difference between depth values of corresponding pixel points in the physical assembly scene depth image A and the physical assembly scene depth image B is less than a preset threshold d, considering this pixel point in the physical assembly scene depth image B as the background and considering the depth value of the corresponding pixel point in the physical assembly body depth image C as 0, or otherwise considering this pixel point in the physical assembly scene depth image B as the assembly body and considering the depth value of the corresponding pixel point in the physical assembly body depth image C as the depth value of the corresponding pixel point in the physical assembly scene depth image B. The pixel points in the two depth images, having same coordinates, are corresponding pixel points in the two depth images.

8. The physical assembly body depth image C is input into the deep learning network model, and a pixel segmentation image of the physical assembly body is output, in which different parts are represented by pixel colors to identify all the parts of the physical assembly body.

9. After identifying all the parts of the physical assembly body, the method further comprises assembly step monitoring: obtaining statistic information about the composition of pixels for parts in the pixel segmentation image of the physical assembly body, determining the composition of the parts, and inquiring a current assembly step according to the composition of the parts and based on the assembly sequence model to complete assembly step monitoring.

10. After identifying all the parts of the physical assembly body, the method further comprises parts assembly monitoring: determining whether a part is assembled incorrectly, specifically: according to the current assembly step, comparing each pixel point in the pixel segmentation image of the physical assembly body with each pixel point in a correct label image corresponding thereto, and respectively calculating a pixel overlap rate $q_z$ between pixels for a part, which is assembled in the current assembly step, in the pixel segmentation image of the physical assembly body with respect to pixels for the part in the correct label image, $$q_z = \frac{n_c}{n_z},$$

wherein $n_c$ represents the number of pixel points, the coordinates of which are overlapped, for the assembled part in the correct label image and the pixel segmentation image, and $n_z$ represents the number of pixel points for the assembled part in the pixel segmentation image of the physical assembly body; the pixel segmentation image of the physical assembly body and the correct label image have a same resolution; the correct label image is a label image synthesized by the imaging model of the depth camera by using coordinates of the depth camera in the physical assembly scene as coordinates of a viewpoint in a virtual scene, and in the correct label image, different parts of the 3D assembly body are rendered by different colors. It is determined that the part is not assembled incorrectly if $q_z$ is greater than or equal to a preset overlap threshold E, or otherwise examination information is presented. Generally, it is indicated that the part is not assembled incorrectly when $q_z$ approaches 1. Therefore, the overlap threshold E may be a numerical value approaching 1.

11. The part assembly monitoring further comprises determining the type of assembly errors, specifically: according to the current assembly step, comparing each pixel point in the pixel segmentation image of the physical assembly body with each pixel point in a correct label image corresponding thereto, and respectively calculating a pixel reduction rate $q_n$ between pixels for a part, which is assembled in the current assembly step, in the pixel segmentation image of the physical assembly body with respect to pixels for the part in the correct label image, $$q_n = \frac{n_a - n_z}{n_a},$$

wherein $n_a$ represents the number of pixel points for the assembled part in the correct label image, and $n_z$ represents the number of pixel points for the assembled part in the pixel segmentation image of the physical assembly body; determining that the part is missed, when the $q_z$ for the part is less than or equal to a preset overlap threshold F and the absolute value of $q_n$ is greater than or equal to a preset missing threshold, that is, the part has a low overlap rate of pixel points and a great difference in the number of pixel points; and determining that the part is misplaced, when the $q_z$ for the part is less than or equal to the preset overlap threshold F and the absolute value of $q_n$ is less than or equal to a preset misplacing threshold, that is, the part has a low overlap rate of pixel points but a small difference in the number of pixel points. The overlap threshold F is a numerical value approaching 0. When $q_z$ is less than the overlap threshold F, it is indicated that the part has a low overlap rate of pixel points. The missing threshold may be a numerical value greater than 0 or approaching 1, indicating a great difference in the number of pixel points for the part between the pixel segmentation image of the physical assembly body and the correct label image. The misplacing threshold may be a numerical value approaching 0, indicating a small difference in the number of pixel points for the part between the pixel segmentation image of the physical assembly body and the correct label image. The absolute value of the obtained $q_n$ approaches 0.

Embodiment 2

Figure 2:
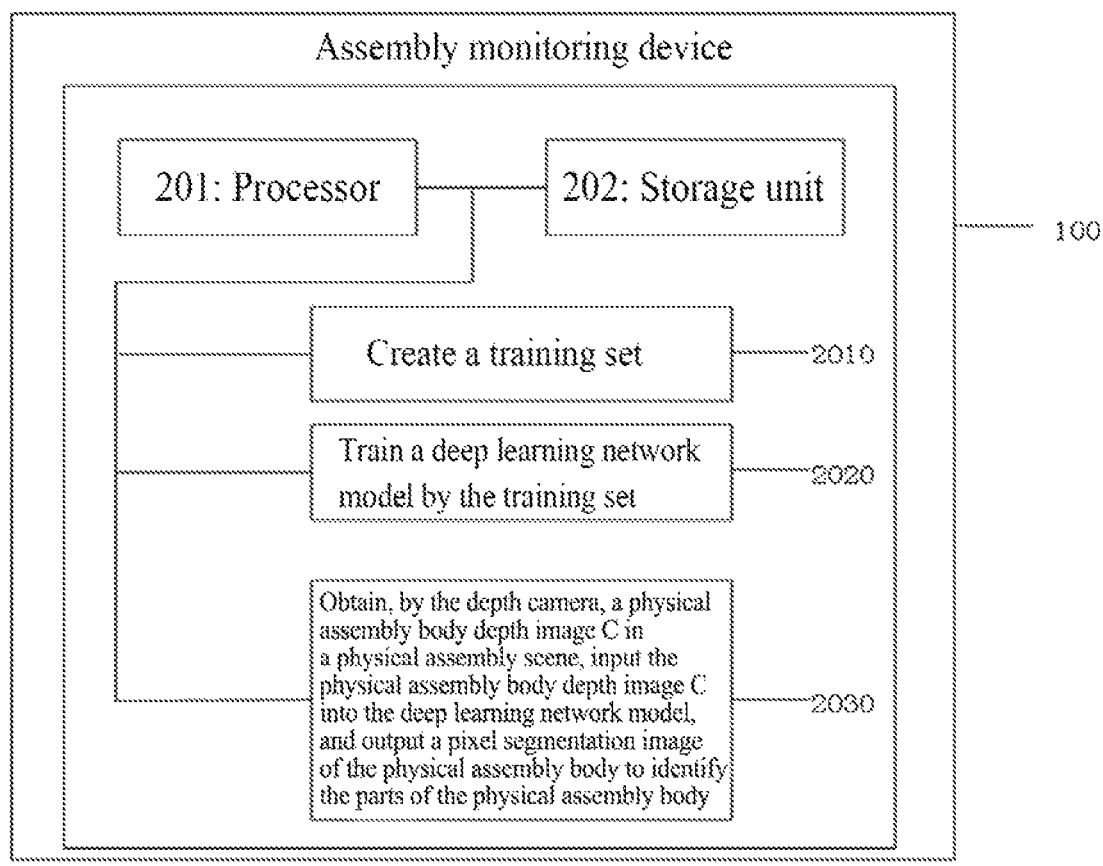
FIG. 2 is a schematic view of an assembly monitoring device based on deep learning.

As shown in FIG. 2, this embodiment is a schematic view of an assembly monitoring device based on deep learning, comprising a server computer system 20. The server computer system comprises a processor 201, a storage unit 202, and a computer program stored in the storage unit and can be run on the processor. The computer program comprises steps of:

2010: creating a training set for a physical assembly body, the training set comprising a depth image set $D_i$ and a label image set $L_i$ of a 3D assembly body at multiple monitoring angles, wherein i represents an assembly step, the depth image set $D_i$ in the ith step corresponds to the label image set $L_i$ in the ith step, and in label images in the label image set $L_i$, different parts of the 3D assembly body are rendered by different colors; and the 3D assembly body is a 3D model of the physical assembly body;

2020: training a deep learning network model by the training set; and

2030: obtaining, by the depth camera, a physical assembly body depth image C in a physical assembly scene, inputting the physical assembly body depth image C into the deep learning network model, and outputting a pixel segmentation image of the physical assembly body, in which different parts are represented by pixel colors to identify all the parts of the physical assembly body.

Embodiment 3

A computer-readable storage medium is provided, storing a computer program that, when executed by the processor, causes the processor to perform steps of:

creating a training set for a physical assembly body, the training set comprising a depth image set $D_i$ and a label image set $L_i$ of a 3D assembly body at multiple monitoring angles, wherein i represents an assembly step, the depth image set $D_i$ in the ith step corresponds to the label image set $L_i$ in the ith step, and in label images in the label image set $L_i$, different parts of the 3D assembly body are rendered by different colors; and the 3D assembly body is a 3D model of the physical assembly body;

training a deep learning network model by the training set; and obtaining, by the depth camera, a physical assembly body depth image C in a physical assembly scene, inputting the physical assembly body depth image C into the deep learning network model, and outputting a pixel segmentation image of the physical assembly body, in which different parts are represented by pixel colors to identify all the parts of the physical assembly body.

The specific steps in the Embodiment 2 and Embodiment 3 may refer to the related descriptions of the embodiment of the method.

The foregoing contents are merely embodiments of the present invention, and are not intended to limit the patent scope of the present invention. Any equivalent structures or equivalent flow transformations made on the basis of the descriptions and drawings of the present invention, or direct or indirect applications thereof in other related technical fields shall be within the patent scope of the present invention.

What is claimed is:

1. An assembly monitoring method based on deep learning, implemented by execution of a computer program by a processor, comprising steps of:

creating a training set for a physical assembly body, the training set comprising a depth image set $D_i$ and a label image set $L_i$ of a 3D assembly body at multiple monitoring angles, wherein i represents an assembly step, the depth image set $D_i$ in the ith step corresponds to the label image set $L_i$ in the ith step, and in label images in the label image set $L_i$, different parts of the 3D assembly body are rendered by different colors; the monitoring angle is an angle of view between a depth camera and an assembly body to be monitored, the depth camera is arranged in situ and changed in its capture angle within a preset rotation range to form the multiple monitoring angles; and the 3D assembly body is a 3D model of the physical assembly body;

training a deep learning network model by the training set; and obtaining, by the depth camera, a physical assembly body depth image C in a physical assembly scene, inputting the physical assembly body depth image C into the deep learning network model, and outputting a pixel segmentation image of the physical assembly body, in which different parts are represented by pixel colors to identify all the parts of the physical assembly body.

2. The assembly monitoring method based on deep learning according to claim 1, wherein the step of creating a training set comprises:
   establishing a 3D assembly body, comprising 3D models of parts and a positional relation between the parts;
   annotating different parts in the 3D assembly body by different colors to establish an annotation model of the 3D assembly body;
   defining an assembly sequence model, comprising defining parts contained in each assembly step; and
   according to the assembly sequence model, loading annotation models of different parts, generating a 3D model and an annotation model for an assembly body corresponding to each assembly step, synthesizing a depth image set $D_i$ of the 3D assembly body at multiple monitoring angles by a depth buffer, and synthesizing a label image set $L_i$ by an imaging model of the depth camera, wherein i represents an assembly step, the depth image set a in the ith step corresponds to the label image set $L_i$ in the ith step, and in label images in the label image set $L_i$, different parts of the 3D assembly body are rendered by different colors thus to establish a training set.

3. The assembly monitoring method based on deep learning according to claim 1, wherein the deep learning network model is a fully convolutional deep network comprising a convolution process and a deconvolution process, and the deep learning network model is trained by using the depth image set $D_i$ in the training set as the input to the deep learning network model and the label image set $L_i$ in the training set as the output from the deep learning network model.

4. The assembly monitoring method based on deep learning according to claim 1, wherein the step of obtaining, by the depth camera, a physical assembly body depth image C in a physical assembly scene comprises:
   in an initialization stage, fixing the depth camera, aligning the depth camera to an assembly zone, and capturing a physical assembly scene depth image A not containing the physical assembly body by the depth camera;
   in a circulation stage, capturing a physical assembly scene depth image B containing the physical assembly body by the depth camera; and
   in the physical assembly scene depth image A and the physical assembly scene depth image B, calculating the physical assembly body depth image C by subtracting depth values of corresponding pixel points, comprising: if the absolute value of the difference between depth values of corresponding pixel points in the depth image A and the depth image B is less than a preset threshold D, considering this pixel point in the depth image B as the background, or otherwise considering this pixel point in the depth image B as the assembly body; and if a pixel point in the depth image A and a pixel point in the depth image B have same coordinates in an image coordinate system, considering the two pixel points as corresponding pixel points.

5. The assembly monitoring method based on deep learning according to claim 2, after identifying all the parts of the physical assembly body, further comprising assembly step monitoring: obtaining statistic information about the composition of pixels for parts in the pixel segmentation image of the physical assembly body, determining the composition of the parts, and inquiring a current assembly step according to the composition of the parts and based on the assembly sequence model to complete assembly step monitoring.

6. The assembly monitoring method based on deep learning according to claim 1, after identifying all the parts of the physical assembly body, further comprising parts assembly monitoring: determining whether a part is assembled incorrectly, comprising:
   according to the current assembly step, comparing each pixel point in the pixel segmentation image of the physical assembly body with each pixel point in a correct label image corresponding thereto, and respectively calculating a pixel overlap rate $q_z$ between pixels for a part, which is assembled in the current assembly step, in the pixel segmentation image of the physical assembly body with respect to pixels for the part in the correct label image, $$q_z = \frac{n_c}{n_z},$$

wherein $n_c$ represents the number of pixel points, the coordinates of which are overlapped, for the assembled part in the correct label image and the pixel segmentation image, and $n_z$ represents the number of pixel points for the assembled part in the pixel segmentation image of the physical assembly body; the correct label image is a label image synthesized by the imaging model of the depth camera by using coordinates of the depth camera in the physical assembly scene as coordinates of a viewpoint in a virtual scene, and each step corresponds to one correct label image; and
   determining that the part is not assembled incorrectly if $q_z$ is greater than or equal to a preset overlap threshold E, or otherwise presenting examination information.

7. The assembly monitoring method based on deep learning according to claim 6, wherein the part assembly monitoring further comprises determining the type of assembly errors, comprising:
   according to the current assembly step, comparing each pixel point in the pixel segmentation image of the physical assembly body with each pixel point in a correct label image corresponding thereto, and respectively calculating a pixel reduction rate $q_n$ between pixels for a part, which is assembled in the current assembly step, in the pixel segmentation image of the physical assembly body with respect to pixels for the part in the correct label image, $$q_n = \frac{n_a - n_z}{n_a},$$

wherein $n_a$ represents the number of pixel points for the assembled part in the correct label image, and $n_z$ represents the number of pixel points for the assembled part in the pixel segmentation image of the physical assembly body; determining that the part is missed, when the $q_z$ for the part is less than or equal to a preset overlap threshold F and the absolute value of $q_n$ is greater than or equal to a preset missing threshold, that is, the part has a low overlap rate of pixel points and a great difference in the number of pixel points; and determining that the part is misplaced, when the $q_z$ for the part is less than or equal to the preset overlap threshold F and the absolute value of $q_n$ is less than or equal to a preset misplacing threshold, that is, the part has a low overlap rate of pixel points but a small difference in the number of pixel points.

8. An assembly monitoring device based on deep learning, comprising a memory, a processor, and a computer program stored in the memory and can be run on the processor, wherein the program, when executed by the processor, causes the processor to perform the assembly monitoring method based on deep learning according to claim 1.

9. A non-transitory computer-readable storage medium storing a computer program that, when executed by the processor, causes the processor to perform the assembly monitoring method based on deep learning according to claim 1.

* * * * *